United States Patent [19]

Hatanaka et al.

[11] Patent Number: 4,634,886

[45] Date of Patent: Jan. 6, 1987

[54] PHOTOELECTRIC IMAGER WITH A HIGH S/N RATIO

[75] Inventors: Katsunori Hatanaka, Yokohama; Yasuo Kuroda, Sagamihara; Shunichi Uzawa, Naka, all of Japan

[73] Assignee: Canon Kabushiki Kaisha, Tokyo, Japan

[21] Appl. No.: 579,588

[22] Filed: Feb. 13, 1984

[30] Foreign Application Priority Data

Mar. 2, 1983 [JP] Japan .................................. 58-34293

[51] Int. Cl.$^4$ ............................................... H04N 5/30
[52] U.S. Cl. ..................................... 250/578; 358/167; 358/213
[58] Field of Search .............................. 250/578, 211 J; 358/212, 213, 167; 357/29, 30, 31, 32

[56] References Cited

U.S. PATENT DOCUMENTS 4,511,804  4/1985  Ozawa ................................. 250/578

Primary Examiner—Edward P. Westin

Attorney, Agent, or Firm—Fitzpatrick, Cella, Harper & Scinto

[57] ABSTRACT

An elongated photoelectric converter unit having a good S/N characteristic but no crosstalk without using any blocking diode. The photoelectric converter comprising: a signal amplifying device having m photosensor groups each consisting of n photosensor elements and n signal amplifying elements connected to the photosensor elements in each group; first and second sample and hold device each having n sample and hold elements connected to the signal amplifying elements; first and second input signal selecting device connected to those first and second sample and hold device, respectively, each of the first and second input signal selecting device having n input signal selecting elements provided corresponding to the respective sample and hold elements of each sample and hold device; and an amplifying device for amplifying the difference between the values of the signals to be transferred from the respective first and second input signal selecting device as a signal and outputting.

3 Claims, 4 Drawing Figures

PHOTOELECTRIC IMAGER WITH A HIGH S/N RATIO

BACKGROUND OF THE INVENTION

1. Field of the Invention

The present invention relates to a photoelectric converter for use in an apparatus for optically inputting characters, symbols, picture images, etc., such as a facsimile, a digital copying machine or the like.

2. Description of the Prior Art

In a so-called line sensor in which a number of photosensor elements are arranged like an array, particularly in an elongated line sensor, it is important to securely separate the input signals from the respective photosensor elements while keeping a high S/N ratio and to transfer to the next signal processor, image producing apparatus and image transfer the signals apparatus.

However, it has been a difficult problem so far to satisfy the above-mentioned characteristic while realizing a low cost.

FIG. 1 is a circuit diagram of a conventional linear photoelectric converter and FIG. 2 is a set of timing charts for the circuit shown in FIG. 1.

In the diagrams a reference numeral 1 denotes a shift register for sequentially applying voltages to m common electrodes ($B_1, B_2, \ldots, B_m$); 2 indicates a photosensor array in which m×n photosensor elements are arranged in a line; 3 is a current amplifier for amplifying the photocurrents to be output from n independent electrodes ($S_1, S_2, \ldots, S_n$); 4 is a sample and hold circuit for memorizing and holding the output signals which were amplified by the current amplifier 3 and were converted into voltages; and 5 is a switching array for converting the output signals of the sample and hold circuit 4 into a serial signal.

The operation of the circuit shown in FIG. 1 will be described. When the i-th common electrode $B_i$ is selected by the shift register 1 and a voltage is applied to the common electrode $B_i$, photocurrents flow through the n photosensor elements ($C_{i1}, C_{i2}, \ldots, C_{in}$) in the i-th group connected to the common electrode $B_i$. After the applied voltage response time of each photosensor element has passed, the signals amplified by the current amplifier 3 are memorized in the sample and hold circuit 4. Then, by sequentially driving the switching elements ($SW_1, SW_2, \ldots, SW_n$) of the switching array 5, the output signals of the sample and hold circuit 4 are converted into a serial signal and this serial signal is sequentially output.

On the other hand, a zero potential is applied to the common electrodes which were not selected.

In addition, the input potentials of the corresponding current amplifier elements of the current amplifier 3 are imaginary zero potentials and no voltage is applied to the photosensor elements connected to the non-selected common electrodes, so that no current flows. Namely, only the signals of the photosensor elements connected to the selected common electrodes are output to the corresponding independent electrodes.

In accordance with the operations as described above, the respective common electrodes $B_1, B_2, \ldots, B_m$ are sequentially selected and the above operations are repeated, thereby enabling the photo information signals which were input to all photosensor elements to be output as serialized signals.

There are the following problems in the conventional photoelectric converter constituted by such a circuit.

(1) It is difficult to drive the non-selected common electrodes exactly at a zero potential, so that in the case of driving by an ordinary bipolar or CMOS IC, a potential of 10–50 mV is generated.

(2) An input offset voltage is generated in the current amplifier connected to the independent electrodes. This voltage is ordinarily about ±10 mV and is applied to the independent electrodes.

In the case of reading out the signals in such a situation, the potentials noted in the above items (1) and (2) are applied to the photosensor elements which are not inherently selected and to which the zero potential should be applied. Due to this, currents flow through these non-selected photosensor elements and these currents are added to the photocurrent signals of the photosensor elements which have been selected; therefore, a signal having crosstalk and a low S/N ratio is obtained.

In general, to solve this problem, a method has been used whereby blocking diodes for obstructing the crosstalk current are connected in series with the respective photosensor elements constituting the photosensor array. These blocking diodes are typically formed as Schottky diodes on the same substrate as the photosensor elements in order to reduce the number of steps for installation and to constitute a compact apparatus.

However, it is difficult according to the present technology to manufacture the diodes having uniform characteristics in the whole longitudinal direction but having relatively low reverse leak current with good yield. This difficulty causes the yield in the manufacture of elongated linear photoelectric converters to be remarkably reduced.

SUMMARY OF THE INVENTION

The present invention was made to solve the above-mentioned problems in a conventional example and it is an object of the invention to provide an elongated photoelectric converter with a good S/N characteristic but no crosstalk, without using any blocking diode. It is another object of the present invention to provide a photoelectric converter having a constitution by which the manufacture yield can be improved as compared with a conventional one.

Still another object of the present invention is to provide a photoelectric converter comprising: signal amplifying means having m photosensor element groups each consisting of n photosensor elements and n signal amplifying elements which are commonly and electrically connected to the respective corresponding photosensor elements in each photosensor element group; first and second sample and hold means each having n sample and hold elements electrically connected to the corresponding signal amplifying elements; first and second input signal selecting means seperately and electrically connected to those first and second sample and hold means, respectively, each of the first and second input signal selecting means having n input signal selecting elements provided corresponding to the respective sample and hold elements of each sample and hold means; and differential signal amplifying means for amplifying the difference between the values of the signals to be transferred from the respective first and second input signal selecting means as a signal and outputting.

DETAILED DESCRIPTION OF THE PREFERRED EMBODIMENTS

The present invention will be described concretely hereinbelow with reference to the drawings.

Figure 1:
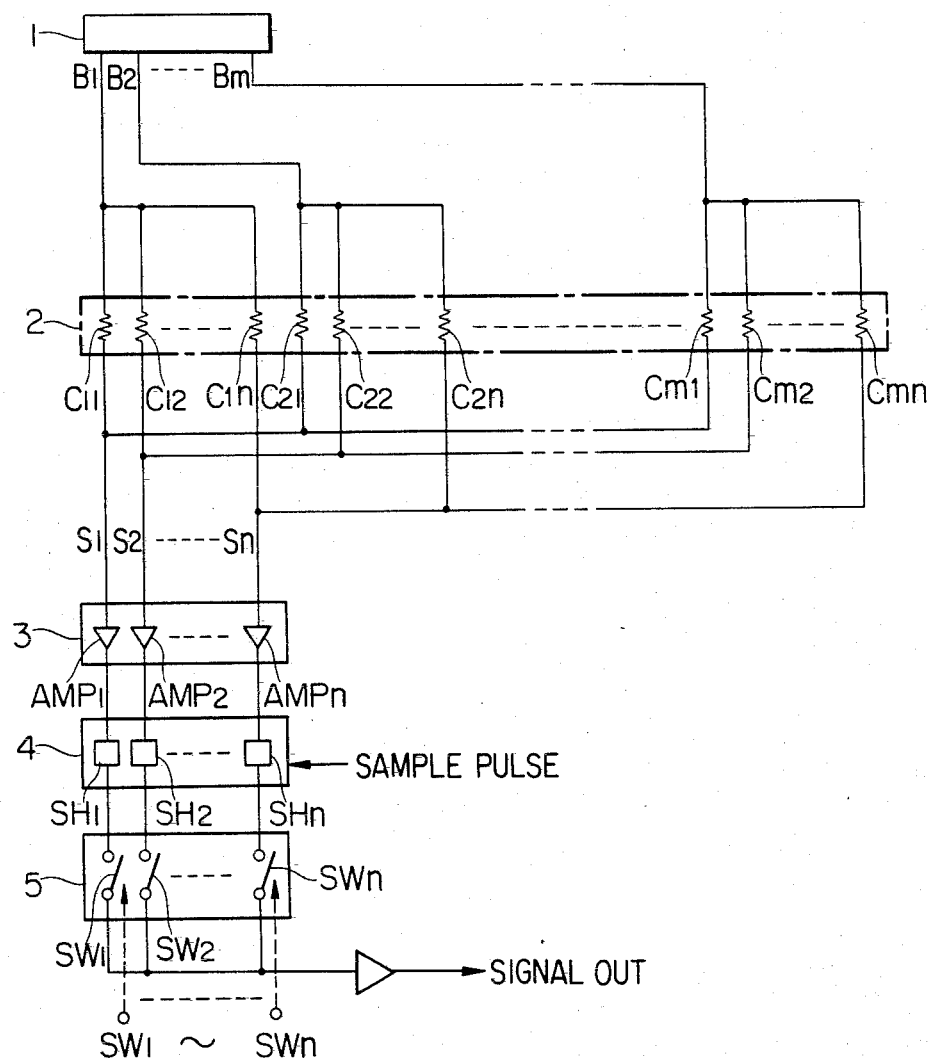
FIG. 1 shows a block diagram of a signal reading circuit of a conventional example.
Figure 2:
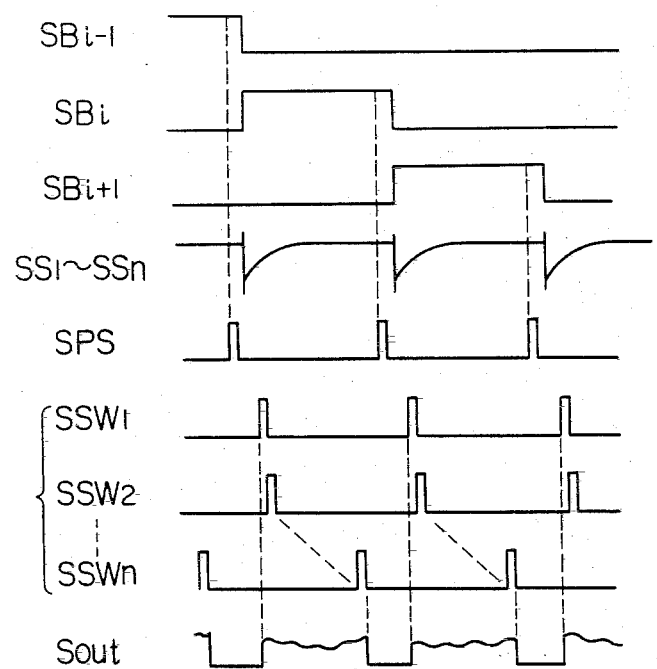
FIG. 2 shows timing charts in the circuit shown in FIG. 1.
Figure 3:
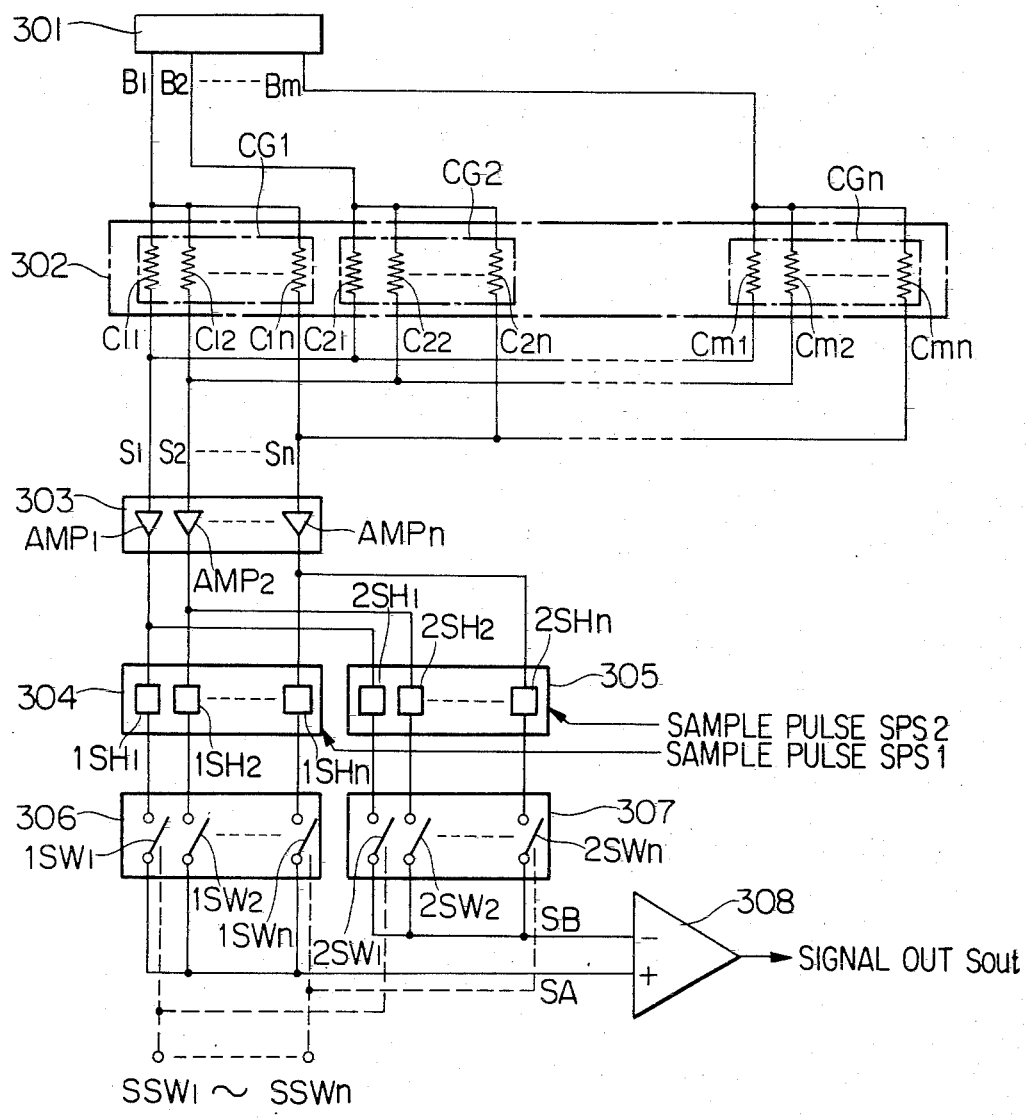
FIG. 3 shows a block diagram of a signal reading circuit of a preferred embodiment of the present invention.

FIG. 3 shows a block diagram of a preferred embodiment of the present invention. A reference numeral 301 denotes a shift register for sequentially selecting the common electrodes $B_1, B_2, \ldots, B_m$ and applying voltages; 302 indicates a photosensor element array; 303 is signal amplifying means for amplifying the photocurrent signals to be output to the independent electrodes $S_1, S_2, \ldots, S_n$; 304 is first sample and hold means for memorizing and holding the output of the signal amplifying means 303; 305 is a second sample and hold means for memorizing and holding the outputs of the signal amplifying means 303; 306 a first switching array for sequentially switching the outputs of the first sample and hold means 305; 307 a second switching array for sequentially switching the outputs of the second sample and hold means 306; and 308 differential signal amplifying means for obtaining the difference between the values of the signals to be output from the first and second switching arrays 306 and 307 and amplifying this difference as a signal.

The photosensor element array 302 consists of m photosensor element groups $(CG_1, CG_2, \ldots, CG_m)$ each having n photosensor elements. The photosensor elements having the same order among the respective photosensor element groups are commonly connected to one of the corresponding independent electrodes. The signals from the respective photosensor elements are input to corresponding signal amplifying elements AMP which constitute the signal amplifying means 303 and are amplified.

The signal amplifying means 303 has n signal amplifying elements $(AMP_1, AMP_2, \ldots, AMP_n)$ provided corresponding to the photosensor elements of the same order in the respective photosensor element groups.

Each of the first and second sample and hold means 304 and 305 has n sample and hold elements SH each of which corresponds to a respective one of the signal amplifying elements $(AMP_1, AMP_2, \ldots, AMP_n)$, individually.

Each of the first and second switching arrays 306 and 307 has n switching elements for sequentially switching the corresponding sample and hold elements in dependence upon the demand.

Figure 4:
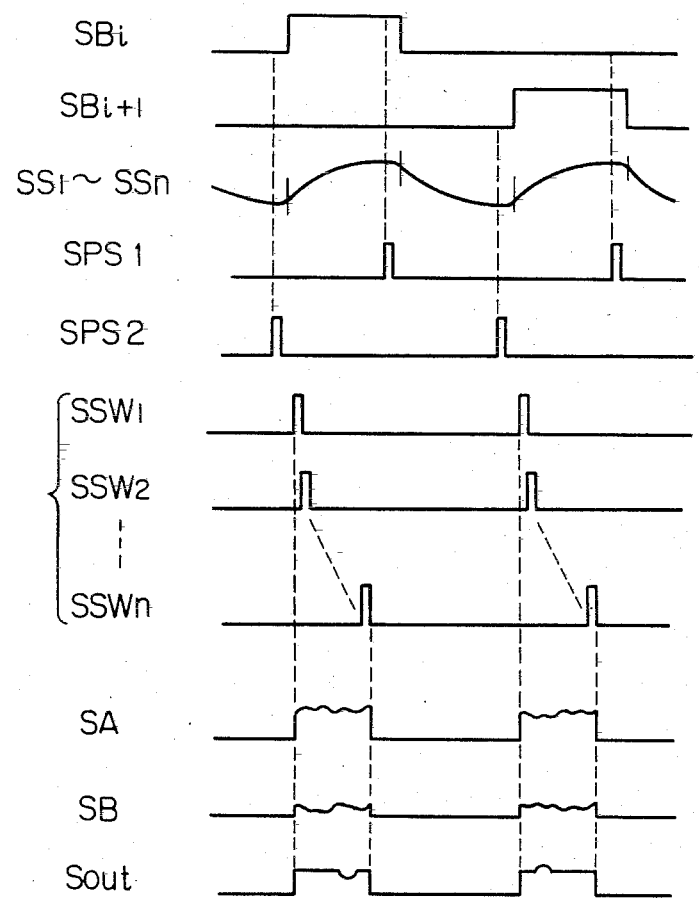
FIG. 4 shows timing charts in the circuit shown in FIG. 3.

FIG. 4 is a set of timing charts for the circuit of FIG. 3. When the i-th common electrode $B_i$ is selected by the shift register 301 and a voltage signal $SB_i$ is applied to the common electrode $B_i$, photo signal currents $SS_1-SS_n$ flow from the photosensor elements $(C_{1i}, C_{2i}, \ldots, C_{mi})$ connected to the common electrode $B_i$ to the independent electrodes $S_1, S_2, \ldots, S_n$. On the other hand, the crosstalk currents flow through the photosensor elements connected to the non-selected common electrodes to the independent electrodes $(S_1, S_2, \ldots, S_n)$; these crosstalk currents are due to the residual potential of the output of the shift register 301 which has been described previously, offset voltage of the signal amplifying means 303, or the like. After the applied voltage response time of the photosensor elements has passed, these photo signal currents $SS_1-SS_n$ and crosstalk currents are amplified by the signal amplifying means 303 and are memorized in the first sample and hold means 304 in response to a sample pulse signal $SPS_1$.

Then, it is assumed that all common electrodes $(B_1, B_2, \ldots, B_m)$ are not selected. At this time, only the crosstalk current components due to the residual potential of the output of the shift register 301 and offset voltage of the signal amplifying means 303 flow through the independent electrodes $(S_1, S_2, \ldots, S_n)$. After the applied voltage response time of each photosensor element has passed, these crosstalk currents are amplified and are memorized in the second sample and hold means 305 in response to a sample pulse signal $SPS_2$.

In this way, the synthesized signals of the photo current signals $SS_1-SS_n$ and noise component signals due to the crosstalk currents are memorized in the first sample and hold means 304, while only the noise component signals due to the crosstalk currents are memorized in the second sample and hold means 305. Thereafter, the switching elements constituting the first and second switching arrays 306 and 307 are respectively switched in the manner such that the switching elements of the same order are switched at the same timing in accordance with the timings of timing pulse signals $(SSW_1, SSW_2, \ldots, SSW_n)$. In this way, the switching elements in each switching array are sequentially switched.

Due to these switching operations, output signals SA and SB which are sequentially output from the first and second switching arrays 306 and 307 are input to the differential signal amplifying means 308 and the noise component signals due to the crosstalk currents are eliminated, so that only the photo signal components of the photosensor elements connected to the common electrodes $B_i$ are serialized and are sequentially output as an output signal $S_{out}$.

It is possible to read out the signal with a good S/N ratio but no crosstalk by performing these series of operations by sequentially selecting all of the common electrodes.

In addition, the photoelectric converter of the present invention does not need diodes for preventing the crosstalk as in a conventional example; therefore, it has a simple constitution and can also improve the manufacture yield.

What we claim is:

1. A photoelectric converter comprising:
   signal amplifying means having m photosensor element groups each consisting of n photosensor elements and n signal amplifying elements each commonly and electrically connected to a respective corresponding one of said photosensor elements in each said photosensor element group;
   first and second sample and hold means each having n sample and hold elements electrically connected to corresponding ones of said signal amplifying elements;
   first and second input signal selecting means separately and electrically connected to said first and second sample and hold means, respectively, each of said first and second input signal selecting means having n input signal selecting elements provided corresponding to the respective sample and hold elements of each of said sample-and-hold means; and differential signal amplifying means for amplifying the difference between the values of signals to be transferred from each of said first and second input signal selecting means and outputting the difference as a signal.

2. A photoelectric converter according to claim 1, further including switching means for sequentially applying voltages to the photosensor elements of each group.

3. A photoelectric converter according to claim 2, wherein said switching means is a shift register.

* * * * *